United States Patent
Kobayashi et al.

(10) Patent No.: US 6,576,169 B2
(45) Date of Patent: Jun. 10, 2003

(54) PRODUCTION PROCESS OF MN-ZN FERRITE

(75) Inventors: Osamu Kobayashi, Iwata-gun (JP); Osamu Yamada, Iwata-gun (JP); Kiyoshi Ito, Iwata-gun (JP)

(73) Assignee: Minebea Co., Ltd., Nagano-ken (JP)

( * ) Notice: Subject to any disclaimer, the term of this patent is extended or adjusted under 35 U.S.C. 154(b) by 0 days.

(21) Appl. No.: 09/989,496

(22) Filed: Nov. 21, 2001

(65) Prior Publication Data

US 2002/0093000 A1 Jul. 18, 2002

(30) Foreign Application Priority Data

Nov. 28, 2000 (JP) ......................................... 2000-361199

(51) Int. Cl.⁷ ............................................... B29B 17/00
(52) U.S. Cl. ...................... 264/37.1; 264/611; 252/62.2
(58) Field of Search ........................ 252/62.2; 264/37.1, 264/37.29, 611

(56) References Cited

FOREIGN PATENT DOCUMENTS

| EP | 1 043 287 A1 | 10/2000 |
| EP | 1 138 649 A2 | 10/2001 |
| JP | 404154625 A * | 5/1992 |
| WO | WO98/32140 | 7/1998 |

* cited by examiner

Primary Examiner—Christopher A. Fiorilla
(74) Attorney, Agent, or Firm—Oliff & Berridge, PLC

(57) ABSTRACT

A production process of a Mn—Zn ferrite enables wastes of sintered cores to be recycled without serious difficulties in sintering. The production process includes recycling a powder obtained by milling a sintered Mn—Zn ferrite, thereby obtaining a sintered core having a component composition including 44.0 to 49.8 mol % $Fe_2O_3$, 4.0 to 26.5 mol % ZnO, 0.02 to 1.00 mol % $Mn_2O_3$ and a remainder MnO.

2 Claims, No Drawings

PRODUCTION PROCESS OF MN-ZN FERRITE

BACKGROUND OF THE INVENTION

1. Field of the Invention

The present invention relates to a production process of a Mn—Zn ferrite, and more particularly to a production process of a Mn—Zn ferrite that enables wastes of sintered products to be recycled.

2. Description of the Related Art

Typical oxide magnetic materials having soft magnetism include a Mn—Zn ferrite that has been used as a low loss material used for switching power transformers, flyback transformers and the like, various inductance elements, an impedanace element for EMI countermeasures, an electromagnetic wave absorber and the like. Conventionally, this Mn—Zn ferrite usually has a basic component composition containing over 50 mol % (52 to 55 mol % on the average) $Fe_2O_3$, 10 to 24 mol % ZnO and the remainder MnO. The Mn—Zn ferrite is usually produced by mixing respective material powders of $Fe_2O_3$, ZnO and MnO in a prescribed ratio, subjecting mixed powders to the respective steps of calcination, milling, component adjustment, granulation and pressing to obtain a desired shape, then performing sintering treatment at 1200 to 1400° C. for 3 to 4 hours in a reducing atmosphere in which a relative partial pressure of oxygen is considerably lowered by supplying nitrogen. The reason why the Mn—Zn ferrite is sintered in the reducing atmosphere is that when the Mn—Zn ferrite containing over 50 mol % $Fe_2O_3$ is sintered in the air, densification is not attained sufficiently thereby failing to obtain excellent soft magnetism, and that $Fe^{2+}$ which has positive crystal magnetic anisotropy is formed by reducing a part of $Fe_2O_3$ exceeding 50 mol % thereby canceling negative crystal magnetic anisotropy of $Fe^{3+}$ and enhancing soft magnetism.

Amount of the above-mentioned $Fe^{2+}$ formed depends on relative partial pressures of oxygen in sintering and cooling after the sintering. Therefore, when the relative partial pressure of oxygen is improperly set, it becomes difficult to ensure excellent soft magnetic properties. Thus, conventionally, the following expression (1) has been experimentally established and the relative partial pressure of oxygen in sintering and in cooling after the sintering has been controlled strictly in accordance with this expression (1).

$$\log Po_2 = -14540/(T+273) + b \tag{1}$$

where T is temperature (° C.), $Po_2$ is a relative partial pressure of oxygen, and b is a constant, which is usually 7 to 8.

In addition, the above-mentioned milling step is conducted so that an average grain size of a fine milled powder ranges 1.0 to 1.4 μm. If the average grain size is more than 1.4 μm, a desired density can not be obtained in sintering, and if the average grain size is less than 1.0 μm, it becomes difficult to handle the resultant powder.

A large amount of wastes are generated for several reasons, such as a surplus, defects and the like in each step of the production process of Mn—Zn ferrite described above. While wastes generated prior to the step of pressing can be recycled without particular problems, wastes generated in the step of sintering due to defects, such as dimensional error, cracking, chipping or the like, are difficult to recycle for the reason described below and are just scrapped as they are.

The step of sintering a Mu—Zn ferrite is largely affected by vacancy concentration of oxygen ions that have the lowest diffusing rate among its constituent ions. As the vacancy concentration of oxygen ions increases, the diffusion of oxygen ions, iron ions, manganese ions and zinc ions is accelerated and the sintered density increases. $Fe_2O_3$ content and a relative partial pressure of oxygen in an atmosphere are factors governing the vacancy concentration of oxygen ions. The smaller the $Fe_2O_3$ content is and the lower the relative partial pressure of oxygen is, the easier the vacancies of oxygen ions can be formed. Because a conventional Mn—Zn ferrite contains over 50 mol % $Fe_2O_3$, the vacancies of oxygen ions decrease, whereas the respective vacancies of iron ions, manganese ions and zinc ions increase. That is, in case a conventional sintered Mn—Zn ferrite is milled and pressed for recycling, it must be sintered with the relative partial pressure of oxygen in an atmosphere considerably lowered. However, the lowest relative partial pressure of oxygen available in actual mass production process is about 0.0001 in which a desired vacancy concentration of oxygen can not be obtained. As a result of this, the sintering can not be conducted smoothly making it difficult to obtain a desired density. Consequently, the resultant sintered cores do not have magnetic properties good enough to serve for practical use and therefore are simply scrapped.

SUMMARY OF THE INVENTION

The present invention has been made in consideration of the above-mentioned conventional problems, and an object of the present invention is therefore to provide a production process of a Mn—Zn ferrite, which enables wastes of sintered cores to be recycled without serious difficulties in sintering.

In order to attain the above-mentioned object, a production process of a Mn—Zn ferrite according to the present invention comprises the steps of: milling a sintered core of Mn—Zn ferrite for recycling; subjecting a recycled powder to a component adjustment so as to have a composition of 44.0 to 49.8 mol % $Fe_2O_3$, 4.0 to 26.5 mol % ZnO, 0.02 to 1.00 mol % $Mn_2O_3$ and a remainder being MnO; pressing a mixed powder subjected to the component adjustment; and sintering a green compact obtained by pressing the mixed powder.

Amount of powder to be recycled, that is a recycled powder, can be arbitrarily selected. When the recycled powder has a target component composition, all mixed powder for pressing may be recycled And, when the recycled powder does not have a target component composition, the components must be adjusted by appropriately adding respective raw material powders of $Fe_2O_3$, ZnO, MnO or the like.

As $Fe_2O_3$ content is restricted to less than 50 mol % in the present invention as mentioned above, vacancies of oxygen ions are easily formed in the sintering step and the density of a sintered core is easily increased. Therefore, when the sintering (heating—maintaining temperature—cooling) is conducted in an atmosphere containing an appropriate amount of oxygen, the resultant sintered core has sufficiently high density even if a recycled powder is used. However, as too small $Fe_2O_3$ content results in lowering the initial permeability, at least 44.0 mol % $Fe_2O_3$ must be contained in the ferrite.

ZnO influences the Curie temperature and saturation magnetization. Too large amount of ZnO lowers the Curie temperature to result in practical problems, but on the contrary, too small amount of ZnO reduces the saturation magnetization, so it is desirable for ZnO content to be set to the above-mentioned range of 4.0 to 26.5 mol %.

A manganese component in the above-mentioned ferrite exists as $Mn^{2+}$ and $Mn^{3+}$. Since $Mn^{3+}$ distorts a crystal lattice: thereby significantly lowering the initial permeability, $Mn_2O_3$ content is set to 1.00 mol % or less. However, since too small $Mn_2O_3$ content lowers the electrical resistivity significantly, at least 0.02 mol % $Mn_2O_3$ must be contained in the ferrite.

It is desirable for the lower limit of the average gram size of the recycled powders to be set to about 1.0 $\mu$m similarly to the prior art, However, even when the average grain size exceeds 1.4 $\mu$m and measures, for example about 2.0 $\mu$m, sufficiently high density is obtained in the sintering.

Since the present invention relates to recycling of wastes of Wintered cores, a recycled ferrite naturally contains additives contained in the wastes of sintered cores. Generally, CaO, $SiO_2$, $ZrO_2$, $Ta_2O_5$, $HfO_2$, $Nb2O_5$, $V_2O_5$, $Bi_2O_3$, $In_2O_3$, CuO, $MoO_3$, $WO_3$, $Al_2O_3$, $TiO_2$ and $SnO_2$ are used as additive. Therefore, the recycled ferrite in the present invention may contain a slight amount of one or more of these additives.

In the present invention, the above-mentioned $Mn_2O_3$ content can be controlled by sintering in an atmosphere of an adjusted relative partial pressure of oxygen. In this case, it is desirable to control the $Mn_2O_3$ content, that is the amount of $Mn^{3+}$, by sintering and cooling after the sintering in an atmosphere of a relative partial pressure of oxygen obtained by using an arbitrary value in a range of 6 to 10 as the constant b in the expression (1). When a value larger than 10 is selected as the constant b, the amount of $Mn^{3+}$ in the ferrite exceeds 1 mol %, whereby the initial permeability is rapidly lowered. Therefore, the amount of $Mn^{3+}$ in the ferrite must be reduced to increase the initial permeability. Thus, it is desired that a small value be selected as the constant b. However, when a value smaller than 6 is selected, $Fe^{2+}$ increases or $Mn^{3+}$ decreases too much, thereby significantly lowering the electrical resistivity. Accordingly, the constant b is set to 6 at smallest. A relative partial pressure of oxygen ($Po_2$) may be set to a range of 0.0001 to 0.21, where the upper limit of 0.21 corresponds to the atmospheric pressure, and the lower limit of 0.0001 can be obtained in actual production process without serious difficulty.

In the present invention, $Fe_2O_3$ content is restricted to less than 50 mol % and a constant b in the expression (1) is set to an arbitrary value selected from a range of 6 to 10 as mentioned above. Therefore, the electrical resistivity of the resultant Mn—Zn ferrite is 10 $\Omega$m or more that is much higher than that of the conventional Mn—Zn (about 0.01 to 1 $\Omega$m). Thus, for example, the Mn—Zn ferrite of the present invention is suitable for a magnetic material used in a high frequency region exceeding 1 MHz.

DETAILED DESCRIPTION OF THE PREFERRED EMBODIMENTS

In production of the Mn—Zn ferrite, wastes of sintered Mn—Zn ferrite generated in sintering step are milled with an appropriate milling measures, for example a hammer mill and a jet mill to obtain a recycled powder, and the respective raw material powders of $Fe_2O_3$, ZnO, MnO and the like as main components are mixed with the recycled powder in a prescribed ratio to obtain a mixed powder having a target component composition. The recycled powder does not have to be grained fine at the beginning, and may have an average grain size of about 40 $\mu$m or less. In this case, the mixed powder described above is calcined, then finely milled to an average grain size of about 2 $\mu$m or less. The temperature for the calcination can be appropriately selected from a range of 850 to 950° C. depending on a target composition. However, if the amount of the raw material powders to be added to the recycled powder is slight, the calcination can be omitted. Further, a general-purpose ball mill can be used for the fine milling of the calcined powder. Then, the respective powders of several additives described above are mixed as required with the fine mixed powders in a prescribed ratio to obtain a mixture having a target component composition. Subsequently, the mixture is granulated and pressed in accordance with a usual ferrite production process, then sintered at 1200 to 1400° C. for 2 to 4 hours In the above-mentioned sintering and cooling after the sintering, a relative partial pressure of oxygen is controlled by flowing inert gas such as nitrogen gas or the like into a sintering furnace. In this case, the constant b in the expression (1) can be arbitrarily set to a value selected from a range of 6 to 10. Further, in this case, since the reaction of oxidation or reduction can be neglected independent of relative partial pressures of oxygen at a temperature of below 500° C., the cooling after the sintering is to be conducted in accordance with the above-mentioned expression (1) only till the temperature gets down to 500° C.

EXAMPLES

Example 1

Respective raw material powders of $Fe_2O_3$, MnO and ZnO were weighed for a composition of 53.0 mol % $Fe_2O_3$, and the remainder including MnO and ZnO with a molar ratio of MnO to ZnO being 3:2, and mixed with a ball mill. Then, the mixed powder was calcined in the air at 900° C. for 2 hours and further milled with a ball mill to obtain a fine milled powder having an average grain size of 1.2 $\mu$m. Then, 0.05 mass % CaO was added to this fine milled powder as additive and the adjusted mixture was further mixed with a ball mill for 1 hour. Then, this mixture was granulated with addition of polyvinyl alcohol, and pressed at a pressure of 80 MPa into toroidal cores (green compacts) each having an outer diameter of 18 mm, an inner diameter of 10 mm and a height of 4 mm. The green compacts were placed in a sintering furnace where an atmosphere was adjusted by flowing nitrogen so as to have such a relative partial pressure of oxygen as obtained by setting the constant b in the expression (1) to 8, sintered at 1300° C. for 3 hours and cooled after the sintering, and a sintered core (comparison sample 1-1) equal to a conventional Mn—Zn ferrite was obtained.

Then, the sintered core (comparison sample 1-1) was milled with a hammer mill and a jet mill so as to have an average grain size of 40 μm or less to obtain a recycled powder. Then, the recycled powder was milled with a ball mill to obtain a mixed powder having an average grain size of 1.2 μm. Then, this mixed powder was granulated with addition of polyvinyl alcohol, and pressed at a pressure of 80 MPa into toroidal cores (green compacts) each having an outer diameter of 18 mm, an inner diameter of 10 mm and a height of 4 mm. The green compacts were placed in a sintering furnace where an atmosphere was adjusted by flowing nitrogen so as to have such a relative partial pressure of oxygen as obtained by setting the constant b in the expression (1) to 8, sintered at 1300° C. for 3 hours and cooled after the sintering, and a recycled sintered core (comparison sample 1-2) having the same component composition as a conventional Mn—Zn ferrite was obtained.

On the other hand, the sintered core (comparison sample 1-1) was milled with a hammer mill and a jet mill so as to have an average grain size of 40 μm or less to obtain a recycled powder in the same manner as the above, and respective raw material powders of MnO and ZnO were added to the recycled powder so as to obtain a composition of 49.0 mol % $Fe_2O_3$, and the remainder including MnO, $Mn_2O_3$ and ZnO with a molar ratio of MnO to ZnO being 3:2 (both MnO and $Mn_2O_3$ are counted as MnO) to obtain a mixed powder. Then, this mixed powder was mixed with a ball mill and calcined at 900° C. for 2 hours. Further, the calcined powder was milled with a ball mill to obtain two different fine milled powders having an average grain size of 1.2 μm and 2.0 μm, respectively. Then, these fine milled powders were both granulated with addition of polyvinyl alcohol, and pressed at a pressure of 80 MPa into toroidal cores (green conapatts) each having an outer diameter of 18 mm, an inner diameter of 10 mm and a height of 4 mm. The green compacts were placed in a sintering furnace where an atmosphere was adjusted by flowing nitrogen so as to have such a relative partial pressure of oxygen as obtained by setting the constant b in the expression (1) to 8, sittered at 130° C. for 3 hours and cooled after the sintering, and respective samples 1-3 and 1-4 of the present invention were obtained.

Final component compositions of the samples 1-1 to 1-4 thus obtained were checked by a fluorescent X ray analysis, and a quantitative analysis of $Mn_2O_3$ for the samples 1-3 and 1-4 of the present invention was conducted by a titration method. In addition, the sintered density and the initial permeability at 1 MHz were measured. The results are shown together in Table 1.

TABLE 1

| Sample No. | Classification | Basic Component Composition (mol %) | | | Average Grain Size (μm) | Sintered Density (kg/m³) | Initial Permeability 1 MHz | $Mn_2O_8$ (mol %) | Electrical Resistivity (Ωm) |
|---|---|---|---|---|---|---|---|---|---|
| | | $Fe_8O_3$ | MnO * | ZnO | | | | | |
| 1-1 | Comparison | 53.0 | 28.2 | 18.8 | 1.2 | $4.97 \times 10^3$ | 1280 | — | 0.1 |
| 1-2 | Comparison | 53.0 | 28.2 | 18.8 | 1.2 | $4.42 \times 10^2$ | 600 | — | 0.1 |
| 1-3 | Present Invention | 49.0 | 30.6 | 20.4 | 1.2 | $4.90 \times 10^2$ | 1240 | 0.47 | 110 |
| 1-4 | Present Invention | 49.0 | 30.6 | 20.4 | 2.0 | $4.83 \times 10^2$ | 1280 | 0.48 | 110 |

* Mn is counted as MnO

As apparent from the results shown in Table 1, the comparison sample 1-2 having the same component composition as a conventional Mn—Zn ferrite has lower density than the comparison sample (brand-new sintered core) 1-1 made from virgin raw material powders and has its initial permeability lowered significantly, which makes the sample 1-2 useless. On the other hand, the samples 1-3 and 1-4 of the present invention, which are recycled, have densities and initial permeabilities equivalent to those of the comparison sample 1-1 of the brand-new sintered core. Therefore, it is clear that the production process of the present invention contributes greatly to the recycling of wastes of sintered cores.

Example 2

The comparison sample 1-1 in Example 1 was milled with a hammer mill and a jet mill so as to have an average grain size of 40 μm or less to obtain a recycled powder. Then, respective raw material powders of MnO and ZnO were added to the recycled powder so as to obtain a composition of 49.0 mol % $Fe_2O_3$, and the remainder including MnO, $Mn_2O_3$ and ZnO with a molar ratio of MnO to ZnO being 3:2 (both MnO and $Mn_2O_3$ are counted as MnO), to thereby obtain a mixed powder. Then, this mixed powder was mixed with a ball mill and calcined at 900° C. for 2 hours. Further, the calcined powder was milled with a ball mill to obtain a fine milled powder having an average grain size of 1.2 μm. Then, this fine milled powder was granulated with addition of polyvinyl alcohol, and pressed at a pressure of 80 MPa into toroidal cores (green compacts) each having an outer diameter of 18 mm, an inner diameter of 10 mm and a height of 4 mm. The green compacts were placed in a sintering furnace where an atmosphere was adjusted by flowing nitrogen so as to have such a relative partial pressure of oxygen as obtained by setting the constant b in the expression (1) to 5.5 to 12, sintered at 1300° C. for 3 hours and cooled after the sintering, and samples (recycled sintered cores) 2-1 to 2-5 were obtained.

A quantitative analysis of $Mn_2O_3$ for the samples 2-1 to 2-5 thus obtained was conducted by a titration method, and the electrical resistivity and the initial permeability at 1 MHz were measured. The results are shown together in Table 2.

TABLE 2

| Sample No. | Classification | b Constant | Electrical Resistivity (Ωm) | Initial Permeability 1 MHz | $Mn_2O_3$ (mol %) |
|---|---|---|---|---|---|
| 2-1 | Comparison | 5.5 | 9 | 850 | 0.01 |
| 2-2 | Present Invention | 6 | 80 | 1200 | 0.26 |
| 2-3 | Present Invention | 8 | 110 | 1240 | 0.47 |
| 2-4 | Present Invention | 10 | 250 | 1210 | 0.98 |
| 2-5 | Comparison | 12 | 290 | 880 | 1.22 |

As apparent from the results shown in Table 2, all the samples 2-2 to 2-4 of the present invention which were sintered in atmospheres of respective relative partial pressures of oxygen obtained by setting the constant b in the expression (1) to 6, 8 and 10 have high initial permeabilities. However, since the comparison sample 2-1 which was sintered in an atmosphere of a relative partial pressure of oxygen obtained by setting the constant b to 5.5 has a low electrical resistivity, it has a low initial permeability at a high frequency region of 1 MHz. And, since the comparison sample 2-5 which was processed by setting the constant b to 12 contains as much as 1.22 mol % $Mn_2O_3$, it has a low initial permeability.

Example 3

The comparison sample 1-1 in Example 1 was milled with a hammer mill and a jet mill so as to have an average grain size of 40 μm or less to obtain a recycled powder. Then, respective raw material powders of MnO and ZnO were added to the recycled powder so as to obtain a composition of 49.0 mol % $Fe_2O_3$, and the remainder including MnO, $Mn_2O_3$ and ZnO with a molar ratio of MnO to ZnO being 3:2 (both MnO and $Mn_2O_3$ are counted as MnO), to thereby obtain a mixed powder. Then, this mixed powder was mixed with a ball mill and calcined at 900° C. for 2 hours. Further, the calcined powder was milled with a ball mill to obtain a fine milled powder having an average grain size of 1.2 μm. Then, 0.05 mass % of $MoO_3$, $V_2O_5$, $ZrO_2$, CuO or $Al_2O_3$ was added to this fine milled powder as additive, and further mixed with a ball mill for 1 hour. Then, this mixture was granulated with addition of polyvinyl alcohol and pressed at a pressure of 80 MPa into toroidal cores (green compacts) each having an outer diameter of 18 mm, an inner diameter of 10 mm and a height of 4 mm. The green compacts were placed in a sintering furnace where an atmosphere was adjusted by flowing nitrogen so as to have such a relative partial pressure of oxygen as obtained by setting the constant b in the expression (1) to 8, sintered at 1300° C. for 3 hours and cooled after the sintering, and samples 3-1 to 3-5 of the present invention were obtained.

A quantitative analysis of $Mn_2O_3$ in the samples 3-1 to 3-5 thus obtained was conducted by a titration method, and the electrical resistivity and the initial permeability at 1 MHz were measured. The results are shown together in Table 3.

TABLE 3

| Sample No. | Classification | Additive Component | Content (mass %) | Initial Permeability 1 MHz | $Mn_2O_3$ (mol %) | Electrical Resistivity (Ωm) |
|---|---|---|---|---|---|---|
| 3-1 | Present Invention | $MoO_3$ | 0.050 | 1270 | 0.46 | 90 |
| 3-2 | Present Invention | $V_2O_5$ | 0.050 | 1260 | 0.47 | 90 |
| 3-3 | Present Invention | $ZrO_2$ | 0.050 | 1210 | 0.45 | 120 |
| 3-4 | Present Invention | CuO | 0.050 | 1220 | 0.48 | 120 |
| 3-5 | Present Invention | $Al_2O_3$ | 0.050 | 1200 | 0.47 | 180 |

As can be seen from the results shown in Table 3, all the samples 3-1 to 3-5 of the present invention maintain high initial permeability even if a slight amount of $MoO_3$, $V_2O_5$, $ZrO_2$, CuO or $Al_2O_3$ as additive is contained.

As described above, according to the production process of the Mn—Zn ferrite of the present invention, a ferrite with sufficiently high density and soft magnetic properties can be obtained from wastes of sintered cores, and the production process does not require a recycled powder to be milled so finely Therefore, the production process of the present invention establishes a recycling technique that is excellent in productivity and cost.

What is claimed is:
1. A production process of a Mn—Zn ferrite, comprising the steps of:
    milling a sintered core of Mn—Zn ferrite for recycling;
    subjecting a recycled powder to a component adjustment so as to have a composition of 44.0 to 49.8 mol % $Fe_2O_3$, 4.0 to 26.5 mol % ZnO, 0.02 to 1.00 mol % $Mn_2O_3$ and a remainder being MnO;
    pressing a mixed powder subjected to the component adjustment; and
    sintering a green compact obtained by pressing the mixed powder.
2. A production process of a Mn—Zn ferrite according to claim 1, wherein sintering is conducted in an atmosphere in which a relative partial pressure of oxygen is adjusted thereby controlling $Mn_2O_3$ content.

* * * * *